United States Patent [19]

Cheng

[11] 4,046,864
[45] Sept. 6, 1977

[54] PROCESS TO PRODUCE CARBON BLACK

[75] Inventor: Paul J. Cheng, Bartlesville, Okla.

[73] Assignee: Phillips Petroleum Company, Bartlesville, Okla.

[21] Appl. No.: 526,981

[22] Filed: Nov. 25, 1974

[51] Int. Cl.² ............................................. C09C 1/50
[52] U.S. Cl. .................................. 423/450; 23/259.5; 423/456
[58] Field of Search ............... 423/450, 455, 456, 457; 23/259.5

[56] References Cited

U.S. PATENT DOCUMENTS

| 2,865,717 | 12/1958 | Krejci | 423/450 |
|---|---|---|---|
| 3,256,065 | 6/1966 | Latham | 23/259.5 |
| 3,490,869 | 1/1970 | Heller | 423/450 |
| 3,867,100 | 2/1975 | Cheng | 423/450 |

FOREIGN PATENT DOCUMENTS

| 2,302,197 | 9/1973 | Germany | 423/450 |
|---|---|---|---|
| 1,177,756 | 1/1970 | United Kingdom | 423/450 |

Primary Examiner—Edward J. Meros

[57] ABSTRACT

A carbon black process is disclosed wherein a reactor is employed having in open axial alignment and operatively connected with each other an axial zone, an enlarged precombustion zone and a smaller Venturi-shaped reaction zone. Into this reactor hydrocarbon feed is axially introduced, from 90 to 30 volume percent of the gases forming the hot combustion gases are introduced tangentially into the precombustion zone, and from 10 to about 70 volume percent of these gases are introduced into the axial zone. In a preferred embodiment the carbon black reactor has an axial zone with an internal diameter of about 1.5 to about 3 times the diameter of the throat of the Venturi-shaped reaction section.

7 Claims, 2 Drawing Figures

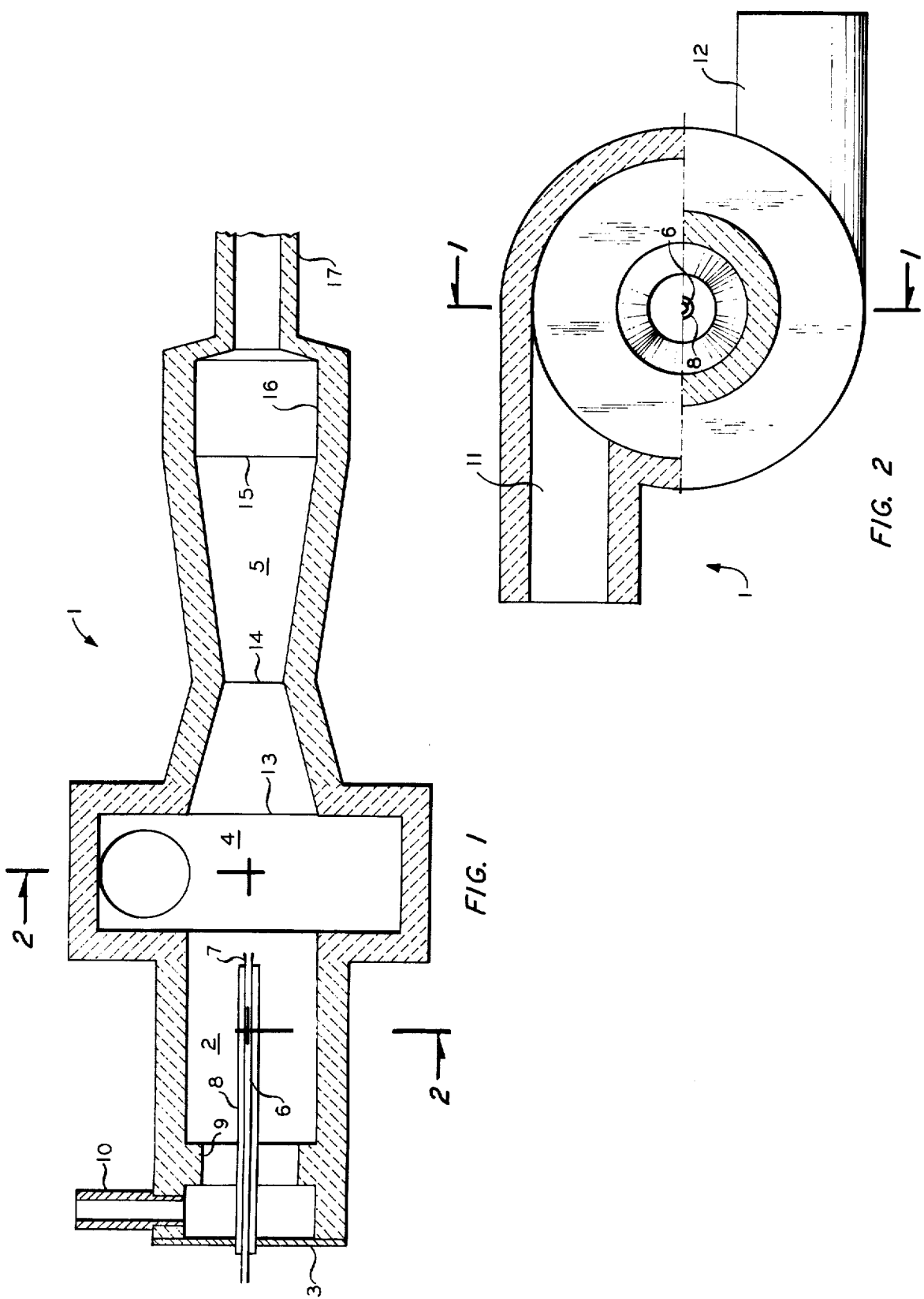

PROCESS TO PRODUCE CARBON BLACK

The production of carbon black in a furnace by pyrolytic decomposition of hydrocarbons is a process well known in the art. One reactor for carrying out this process comprises an axial zone, an enlarged precombustion section with tantential introduction of the gases forming the hot combustion gases in open communication and axial alignment operatively connected with said axial zone, and a reaction zone having a smaller diameter than said precombustion zone and being provided with a Venturi-shaped choke in axial alignment and open communication and operatively connected with said precombustion zone. It remains desirable to increase the yield and the tint residue of the carbon black produced in such a reactor in order to produce a carbon black with a narrower aggregate size distribution as compared to the carbon black produced by the known process.

THE INVENTION

It is one object of this invention to provide a new carbon black process.

A further object of this invention consists in providing a carbon black process to produce carbon black with high yield.

Another object of this invention consists in providing a carbon black process to produce carbon black with high tint residue.

Still a further object of this invention is to provide a carbon black process for producing carbon black having a narrow aggregate size distribution.

Other objects, aspects, advantages and embodiments of this invention will become apparent to those skilled in the art from the following detailed description of the invention together with the appended claims and the attached drawing of which FIG. 1 shows a longitudinal cross section through a carbon black reactor for carrying out the process of this invention; and FIG. 2 is a cross section taken across 2—2 of the reactor shown in FIG. 1.

In accordance with this invention I have now found that yield and tint residue of the carbon black produced using a carbon black reactor comprising in open communication and axial alignment and operatively connected with each other, an axial zone, an enlarged precombustion zone, and a Venturi-shaped reaction zone, can be increased by introducing an amount of at least 10 percent and up to 70 percent of the gases forming hot combustion gases into said axial zone and between 90 and 30 percent of said gases into said precombustion zone.

The hydrocarbon feed, being liquid under normal conditions, can be any liquid hydrocarbon feed or oil conventionally used to produce carbon black. Preferably a hydrocarbon feed comprising a major portion of aromatics is employed.

To produce the hot combustion gases, the heat of which is used for the pyrolytic decomposition of the hydrocarbon feed into carbon black, generally speaking, a gaseous fuel and a free oxygen-containing gas are employed. The preferred group of oxygen-containing gases consists of oxygen, oxygen-enriched air and air. Any gaseous fuel can be employed to produce the hot combustion gases. Natural gas, propane and mixtures thereof are the presently preferred gaseous fuels.

The hot combustion gases for the purposes of this invention can be either introduced into the reactor as such or the fuel and the free oxygen-containing gas can be introduced separately and be combusted in the reactor. Both embodiments should be encompassed by the term "gases forming the hot combustion gases". It is presently preferred to introduce the portion of said gases forming the hot combustion gases that is introduced into the axial zone separately, i.e., the fuel and the oxygen-containing gas are introduced separately into the axial zone and combusted therein. The portion of the free oxygen-containing gas and the gaseous fuel introduced into said precombustion zone in accordance with the preferred embodiment of this invention is mixed shortly before these gases enter the precombustion zone. The combustion of that portion of the gaseous fuel thus starts in the conduits leading to the precombustion zone and continues in said zone.

In accordance with a presently preferred embodiment, about 15 to about 60 volume percent of the gases forming the hot combustion gases are introduced into said axial zone of the reactor. These gases are mixed in said axial zone and combusted therein. About 85 to about 40 volume percent of the gases forming the hot combustion gases is preferably introduced tangentially into said precombustion zone.

It is preferred to carry out this process with a ratio of oxygen-containing gas to gaseous fuel which is above the stoichiometric ratio. By stoichiometric ratio the quantities of oxygen-containing gas and fuel are defined to be such that the entire quantity of fuel is burned and oxidized and no oxygen is left. To operate above the stoichiometric ratio of oxygen-containing gas to gaseous fuel, or to create oxygen-rich combustion gases, the gases constituting or resulting in the combustion gases introduced into the axial zone and into the tangential zone can be either both oxygen-rich or one of them is oxygen-rich and one of them is fuel-rich. In the latter case the ratio of total oxygen-containing gases to gaseous fuel would be above stoichiometric. In the case of air as the oxygen-containing gas and natural gas as the fuel, the volume ratio for the stoichiometric composition is 10 volumes of air to 1 volume of natural gas. An oxygen-rich combustion gas mixture would contain more air whereas a fuel-rich mixture would contain more natural gas than defined by this ratio.

In accordance with a preferred embodiment of this invention, there is employed an axial carbon black reactor wherein the axial zone has a diameter which is about 1.5 to about 3 times the diameter of the throat of the Venturi-shaped reaction section. By this relationship optimum efficiency both of the axial zone and of the Venturi choke is achieved.

The invention will be more fully understood from the following detailed description of preferred embodiments of the process in connection with the reactor shown in the drawing.

The axial carbon black reactor used to carry out the process of this invention comprises a tubular shell of refractory material. This heat-resistant lining or shell 1 is arranged inside of a steel housing not shown in the drawing. The tubular shell is divided into an axial section 2 closed at its upstream end by a plate 3, a mixing or precombustion section 4 and a Venturi-shaped reaction section 5. These three sections are all in open communication and axail alignment operatively connected with each other.

Liquid hydrocarbon is axially fed through a pipe 6 to a nozzle 7 and from there axially into the reactor. Through pipe 8 surrounding pipe 6 and extending through the upstream confining plate 3, gaseous fuel is introduced into the reactor. The section of the shell 1 surrounding the axial zone 2 has a choke 9 upstream of which air is introduced via a pipe 10 to form hot combustion gases with the fuel introduced via pipe 8. The fuel introduced via pipe 8 and the air introduced via pipe 10 mix to constitute a first portion of the total hot combustion gases. The first portion is 10 to 70 volume percent, preferably 15 to 60 volume percent of the entire hot combustion gases.

The precombustion zone 4 has a larger internal diameter than the axial zone and the reaction zone. Free oxygen-containing gas and gaseous fuel or hot combustion gases are tangentially introduced through conduits 11 and 12 (shown in FIG. 2) into the precombustion zone to form a vortex of hot combustion gases surrounding the hydrocarbon feedstream and mixing with this stream as well as with the hot combustion gases coming from the axial zone.

The gas mixture then enters the Venturi-shaped reaction section 5 through the inlet opening 13. While the mixture passes through the Venturi-shaped zone through the throat 14 and the outlet end 15, carbon black is formed by pyrolytical decomposition of the hydrocarbon feed.

The carbon black-containing gas leaving the reaction section is passed through a cylindrical zone 16 in which the usual quenching takes place. The quenching elements are not shown in the drawing. The carbon black-containing gas is withdrawn from the downstream end of a reactor via a conduit 17.

The preferred ranges for the carbon black reactor employed in accordance with this invention are given in the following. The internal diameter of the axial zone should be about 1.5 to about 3 times the diameter of the throat of said Venturi nozzle-shaped chamber. The precombustion zone should have an internal diameter of about 3 to about 5 times the diameter of the throat of the Venturi-shaped chamber and the axial length of the precombustion section should be about 1 to about 1.5 times the throat diameter. The inlet diameter of the Venturi nozzle-shaped reaction zone preferably is about 1.5 to about 3 times the throat diameter and equal to or smaller than the diameter of the axial zone. The Venturi nozzle-shaped chamber forming the reaction zone in this preferred embodiment has a first portion the internal wall of which converges in the direction of the flow of the reactant mass, forming an angle with the reactor axis of about 10° to about 20°, a throat and a diverging portion the internal wall of which forms an angle with the reactor axis of about 4° to about 15°. The diameter of the throat of the Venturi nozzle-shaped reaction zone is not critical. However, diameters of said throat in the range of about 5 to about 10 inches are presently preferred.

To increase the throughput of the materials through the reactor, means for tangentially feeding the oxygen-containing gas and the gaseous fuel or the hot combustion gases into the enlarged precombustion zone are provided as shown in FIG. 2. The gases introduced through these tangential inlets 11 and 12 form a vertex of hot combustion gases around the hydrocarbon feedstream.

EXAMPLE I

A series of runs was carried out in a reactor of the type described above having the following dimensions: length of the axial zone, 30 inches; diameter of axial zone, 15 inches; length of precombustion zone, 15 inches, diameter of precombustion zone, 37 inches; diameter of Venturi inlet, 15 inches; diameter of Venturi outlet, 15 inches; length of the converging portion of the Venturi, 13 inches; length of the diverging portion of the Venturi, 25 inches; location of the feed nozzle with respect to the entrance of the mixing section, variable; angle of the converging portion of the Venturi with the axis, 15°; angle of the diverging portion of the Venturi with the axis, 8°.

Into this reactor the reactants shown in the following table were introduced in quantities also shown in the following table. The results of these runs are also shown in the table.

TABLE I

| Run | 1 | 2 | 3 | 4 |
| --- | --- | --- | --- | --- |
| Tangential air SCFH[1] | 165,000 | 165,000 | 165,000 | 190,000 |
| Tangential gas SCFH | 13,636 | 10,855 | 13,525 | 14,729 |
| Axial air SCFH | 56,955 | 61,394 | 59,805 | 28,247 |
| Axial gas, SCFH | 4,707 | 4,039 | 4,902 | 2,190 |
| Total air/gas volume ratio | 12/1 | 15.2/1 | 12.2/1 | 12.9/1 |
| Oil rate, gph[2] | 221 | 251 | 192.5 | 203.5 |
| Air/oil ratio SCF/gal. | 1004 | 902 | 1168 | 1073 |
| Oil tube position (in.)[9] | −11″ | −11″ | +6″ | +6″ |
| $I_2NO$ m$^2$/g[3] | 91.9 | 95.6 | 109 | 109 |
| $N_2SA$ m$^2$/g[4] | 103 | 97 | 110 | 111 |
| CTAB m$^2$g/[5] | 102.5 | 100 | 110 | 110 |
| 24 M4 cc/100 g[6] | 99.7 | 105 | 86 | 87 |
| Tint[7] | 112 | 107.9 | 119 | 123.2 |
| Tint residue[8] | +2.5 | +0.3+2.5 | +6.9 | |
| Yields lbs/gal. | 3.69 | 3.28 | 3.00 | 3.12 |

[1]SCFH means standard cubic feet per hour; the gas used was natural gas.
[2]gph means gallons per hour; the oil used was an aromatic hydrocarbon oil having a BMCI of 100 (SO$_2$ extract) and an API gravity of about 9 at 60° F.
[3]Iodine number of the carbon black; it is measured in accordance with ASTM D 1518-70.
[4]Surface area of the carbon black measured with nitrogen in accordance with ASTM D 3037-71-T, Method A.
[5]Surface area of the carbon black measured as described by J. Janzen, and G. Kraus, Rubber Chem. & Tech., 44, 1287 (1971).
[6]Structure of the carbon black measured with dibutylphalate (DBP) after a compression procedure described in the U.S. Pat. No. 3,548,454, the DBP structure being measured by Method B of ASTM Method D 2414-70; the 24 M4 is measured in cc/100 g.
[7]Measured as specified in the Goodyear Tire & Rubber Company Materials Acceptance Specification, August 18, 1972, Code P-19194.
[8]The tint residue is a value calculated from the measured tint, the measured CTAB, the measured N$_2$SA and the measured 24 M4 in accordance with the impirical formulae
 Tint residue = Tint (measured) - Tint (calculated)
(calculated) = 56 + 1.057 (CTAB) - 0.00 2745 (CTAB)$^2$ - 0.2596 (24 M4) - 0.201 (N$_2$SA - CTAB)
[9]Axial positioon of the nozzle with respect to the inlet of the precombustion zone; a positive value shows that the nozzle is in the precombustion zone, a negative value that the nozzle is recessed and located in the axial zone.

From the results of this table it can be seen that introduction of gases in accordance with the process of this invention gives both good yield and high tint residue of the carbon black produced. A high value for the tint residue indicates a narrow aggregate size distribution which is desirable.

In order to compare the results of the runs of Example I with the results of other carbon black processes the following two examples were carried out.

EXAMPLE II

Example I, run 1 was essentially repeated with the quantities of reactants shown in the following table. However, instead of a reactor having a Venturi-shaped reaction zone, a reactor having a cylindrical choke of 8 inches internal diameter and 10 inches axial length was used. This choke was located immediately at the entrance of the reaction zone. The results are shown in the following Table II.

TABLE II

| | |
|---|---|
| Tangential air SCFH | 165,000 |
| Tangential gas SCFH | 13,525 |
| Axial air SCFH | 52,312 |
| Axial gas, SCFH | 4,288 |
| Total air/gas volume ratio | 12.2/1 |
| Oil rate, gph | 204 |
| Air/oil ratio SCF/gal. | 1065 |
| Oil tube position NL (in.) | −11" |
| $I_2NO$ m$^2$/g | 99 |
| $N_2SA$ m$^2$/g | 104 |
| CTAB m$^2$/g | 105 |
| 24 M4 cc/100 g | 105 |
| Tint | 109.3 |
| Tint residue | 0.0 |
| Yield lbs/gal. | 3.27 |

A comparison of the results of run 1 of Example I (Table I) with the results shown in Table II shows that the process of this invention increases both the yield and the tint residue (although the air-to-oil ratio is higher in Example II compared with run 1 of Example I). The results show that the use of a Venturi reaction zone is essential for obtaining the results.

EXAMPLE III

To demonstrate the influence of the axial zone on the process of this invention, the following example was carried out using an O-type carbon black reactor with a Venturi-shaped choke. This reactor, however, had no axial zone. The reactor dimensions were as follows:

TABLE III

| | 3" Reactor | Scaled up to a 15" Reactor |
|---|---|---|
| Tangential air SCFH | 6,000 | 150,000 |
| Tangential gas SCFH | 400 | 10,000 |
| Axial air SCFH | 175 | 4,400 |
| Axial gas SCFH | 0 | 0 |
| Total air/gas volume ratio | 15/1$^{(1)}$ | 15/1 |
| Oil rate, gph | 6.3 | 158 |
| Air/oil ratio SCF/gal. | 980 | 980 |
| Oil tube position NL (in.) | +2" | +6" |
| $I_2NO$ m$^2$/g | — | — |
| $N_2SA$ m$^2$/g | 113 | 113 |
| CTAB m$^2$/g | 112 | 112 |
| 24 M4 cc/100 g | 83 | 83 |
| Tint | 119 | 119 |
| Tint residue | 0.8 | 0.8 |
| Yield lbs/gal. | 2.94 | 2.94 |

$^{(1)}$Calculated from propane with excess air (50 volume percent air over stoichiometric composition)

The results of this example shown in Table III compared with the results of run 4 of Example I show an increase both in tint residue and in yield in case of the present invention as compared to a process employing a reactor having a Venturi-shaped reaction zone but having no axial zone.

Reasonable variations and modifications which will be apparent to those skilled in the art can be made in this invention without departing from the spirit and scope thereof.

I claim:

1. A carbon black process wherein
   a. a hydrocarbon feedstock liquid under normal conditions is axially introduced into a tubular reactor comprising
      an axial zone;
      an enlarged precombustion zone having a larger internal diameter than the axial zone in open communication and axial alignment operatively connected with said axial zone;
      a reaction zone formed as a Venturi nozzle-shaped chamber in open communication and axial alignment and operatively connected with said precombustion zone;
      the diameter of said axial zone being about 1.5 to about 3 times the diameter of the throat of said Venturi nozzle-shaped chamber,
   b. free oxygen-containing gas and gaseous fuel forming hot combustion gases are introduced into said axial zone;
   c. free oxygen-containing gases and fuel forming hot combustion gases are introduced into said precombustion zone;
   d. about 10 to about 70 volume percent of the total of the gases forming the hot combustion gases are introduced into said axial zone in step (b);
   e. a carbon black-containing gas is withdrawn from said reaction section; and
   f. carbon black is recovered from said gas.

2. A process in accordance with claim 1 wherein about 15 to about 60 volume percent of the free oxygen-containing gas and of the gaseous fuel resulting in the total hot combustion gases are introduced into said axial zone.

3. A process in accordance with claim 1 wherein hot combustion gases are tangentially introduced into said precombustion zone such as to form a vortex of hot combustion gases around the axial hydrocarbon feed stream.

4. A process in accordance with claim 1 wherein said free oxygen-containing gas is selected from the group consisting of oxygen, oxygen-enriched air and air.

5. A process in accordance with claim 4 wherein air and a gaseous hydrocarbon fuel are used to form the hot combustion gases in an excess of air of about 20 to about 50 volume percent above the stoichiometric composition.

6. A process in accordance with claim 4 wherein air is used as the free oxygen-containing gas and the liquid hydrocarbon feed is used in a quantity so that the air-to-liquid hydrocarbon feed ratio is about 900 to about 1200 SCFH air/gallon of feed.

7. A process in accordance with claim 1 wherein the hydrocarbon feedstock is axially introduced into the axial zone of the reactor.

* * * * *